(12) United States Patent
Ablowitz et al.

(10) Patent No.: US 8,626,591 B2
(45) Date of Patent: Jan. 7, 2014

(54) METHODS, SYSTEMS, AND COMPUTER PROGRAM PRODUCTS FOR STORING USUAL ORDER PREFERENCE DATA FOR RECURRENT ORDERS

(75) Inventors: Todd Ablowitz, Sunnyvale, CA (US); Mohammad Khan, San Jose, CA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 12/191,288

(22) Filed: Aug. 13, 2008

(65) Prior Publication Data

US 2009/0063285 A1 Mar. 5, 2009

Related U.S. Application Data

(60) Provisional application No. 60/966,870, filed on Aug. 30, 2007.

(51) Int. Cl.
*G06Q 20/00* (2012.01)
(52) U.S. Cl.
USPC .............. 705/16; 705/40; 705/44; 705/64; 705/76; 705/30; 705/15; 705/35; 705/67; 705/22; 705/17; 705/52; 705/32; 455/423; 455/446; 455/450; 235/383; 235/380; 235/379; 711/141; 711/124; 711/146
(58) Field of Classification Search
USPC .......................................... 705/32
See application file for complete search history.

(56) References Cited

U.S. PATENT DOCUMENTS

| | | | |
|---|---|---|---|
| 6,078,928 A * | 6/2000 | Schnase et al. | 705/7.31 |
| 6,141,006 A * | 10/2000 | Knowlton et al. | 705/27.1 |
| 2001/0044751 A1* | 11/2001 | Pugliese et al. | 705/26 |
| 2004/0133474 A1* | 7/2004 | Tami et al. | 705/16 |
| 2004/0210621 A1* | 10/2004 | Antonellis | 709/200 |
| 2005/0033689 A1 | 2/2005 | Bonalle et al. | |
| 2005/0234778 A1* | 10/2005 | Sperduti et al. | 705/22 |
| 2007/0088624 A1 | 4/2007 | Vaughn et al. | |
| 2007/0291710 A1 | 12/2007 | Fadell | |

OTHER PUBLICATIONS

Diss.Zhang, Yan. Power-aware design in modern computing systems. University of Virginia, ProQuest, UMI Dissertations Publishing, 2007.*

* cited by examiner

*Primary Examiner* — Ryan Zeender
*Assistant Examiner* — Fawaad Haider
(74) *Attorney, Agent, or Firm* — Jenkins, Wilson, Taylor & Hunt, P.A.

(57) ABSTRACT

Methods, systems, and computer program products for storing usual order preferences associated with a point of sale transaction involving an identification article. In one embodiment, the method includes receiving an initial order involving the use of an identification article for purchasing at least one good or service. As part of receiving the initial order, a query asking if the initial order is to be designated as a usual order is issued. The method also includes registering the initial order as the usual order if a received response to the query indicates a usual order designation and storing an indication of the usual order in a storage medium.

11 Claims, 3 Drawing Sheets

METHODS, SYSTEMS, AND COMPUTER PROGRAM PRODUCTS FOR STORING USUAL ORDER PREFERENCE DATA FOR RECURRENT ORDERS

RELATED APPLICATIONS

This application claims the benefit of U.S. Provisional Patent Application Ser. No. 60/966,870, filed Aug. 30, 2007, the disclosure of which is incorporated herein by reference in its entirety.

TECHNICAL FIELD

The subject matter described herein relates to payment systems and storing a customer's usual order preference data to efficiently handle recurring order transactions. More particularly, the subject matter described herein relates to methods, systems, and computer program products for storing usual order preference data for recurrent orders.

BACKGROUND

Presently, in many business establishments, total sales may be limited by the number of transactions that can be processed in a limited period of time. This typically occurs in situations where the demand for a good or service during a time period exceeds the ability to process transactions to purchase the good or service within that time period. For example, a fast food restaurant may be extremely busy at certain times during the day, thereby compelling potential customers to forgo purchases if the line or wait is too long. As a result, sales may be increased if the demand can be immediately or more efficiently met. Thus, any means or process to reduce waiting time may be helpful to increase overall sales.

In one example, it is common practice for a customer to order the same menu item (e.g., a specific type of hamburger at a fast food restaurant) during each visit. Arguably, a certain amount of time may be wasted over an extended time period by repeatedly asking for a customer's order if it is always the same on each subsequent visit. Notably, the time required to determine the appropriate order may be significant when the number of recurrent customers that frequent a given place of business is considered. Consequently, wait times may be increased if usual orders are constantly being asked for, especially at peak processing times (e.g., lunch time).

Continuing with the fast food restaurant example, by improving the efficiency of the purchase transaction process, if the fast food restaurant can take orders more efficiently, the restaurant can devote more employee time to the preparation of food and beverage items which in turn decrease wait times. As stated above, a decrease in wait time can increase sales.

In an effort to improve the efficiency of the transaction process, some business establishments also receive orders over the telephone and/or via the Internet. Although ordering via telephone or via the Internet eliminates the requirement of physically standing in line, processing delays caused by the failure to recognize recurrent orders can still occur. Furthermore, there may be certain goods and services where ordering (e.g., via on-line or by telephone) from home or some other location that is not proximate to the store is not ideal due to the amount of time that transpires between the customer's placement of the order and the time the good is delivered or picked up (or the service is rendered). For example, on-line ordering is unsuitable for some goods that must be enjoyed or consumed immediately, such as hot or freshly prepared items.

Thus, a more efficient order processing method is desirable. More specifically, there exists a need for methods, systems, and computer program products for storing usual order preference data for recurrent orders.

SUMMARY

According to one aspect, the subject matter described herein comprises methods, systems, and computer program products for storing usual order preferences. One method includes receiving an initial order involving the use of an identification article for purchasing at least one good or service. As part of receiving the initial order, a query asking if the initial order is to be designated as a usual order is issued. The method also includes registering the initial order as the usual order if a received response to the query indicates a usual order designation and storing an indication of the usual order in a storage medium.

The subject matter described herein for storing usual order preference data utilizing an identification article may be implemented using a computer program product comprising computer executable instructions embodied in a tangible computer readable medium that are processed by a computer processor or like device. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for storing usual order preferences described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
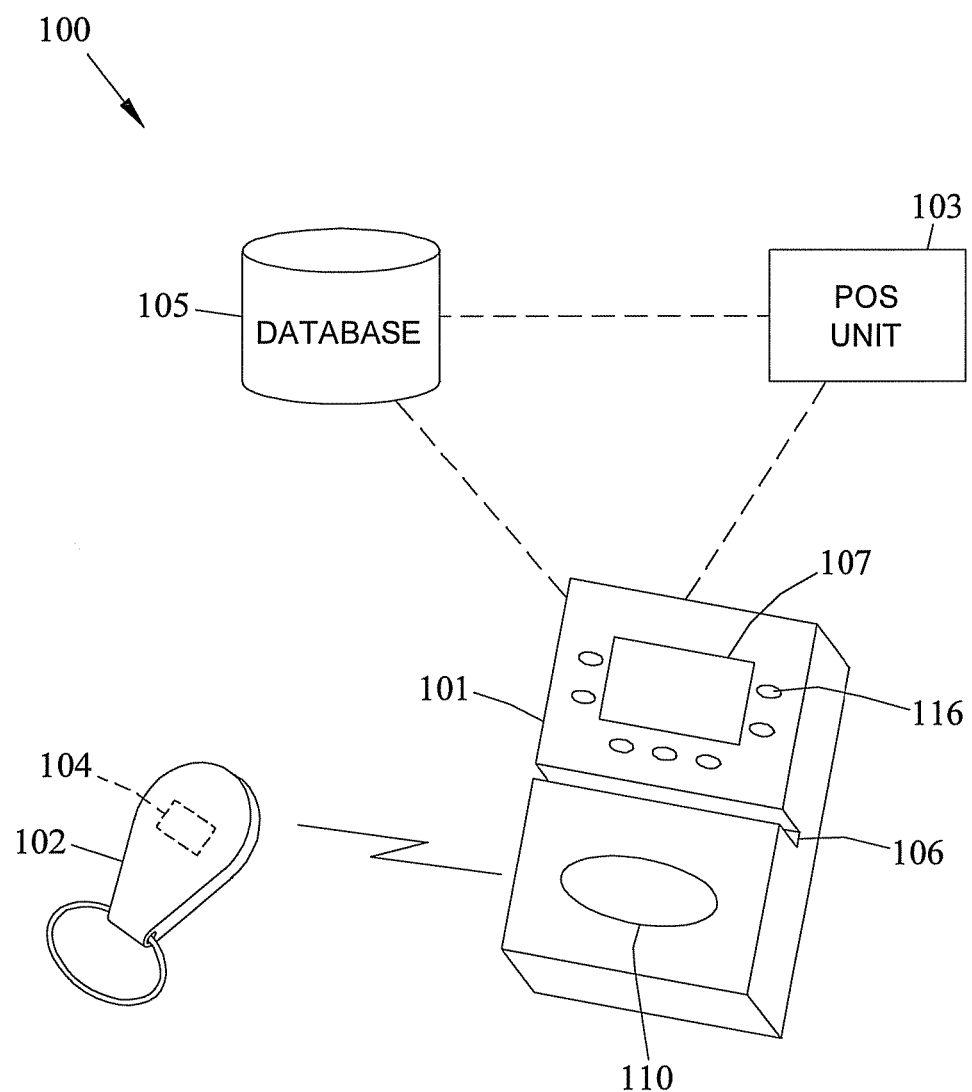
FIG. 1 is an exemplary payment system according to an embodiment of the subject matter described herein.

The present subject matter relates to systems, methods, and computer program products for utilizing an identification article for storing recurrent ordering data. More specifically, the present subject matter is configured to store usual order preference data using the identification article to provide a customer with the ability to make recurrent orders with greater efficiency. In one embodiment, the usual order data is stored in a storage medium or device, such as in a database or on the identification article (e.g., a contactless smart device) itself. FIG. 1 illustrates an exemplary payment system 100 that facilitates recurrent ordering made by a contactless smart device according to an embodiment of the subject matter described herein. Although payment system 100 is illustrated in FIG. 1 as utilizing a contactless smart device and a contactless device reader, this implementation is only meant to serve as a depiction of an exemplary embodiment. Namely, other means for initiating and conducting a usual order transaction may be employed without departing from the scope of the present subject matter (e.g., a magnetic stripe card and swipe reader, a cellular phone functioning as an NFC-enabled handset and a smart poster, an infrared reader and barcode, etc.).

Referring to FIG. 1, payment system 100 may include a contactless device reader 101. System 100 may optionally include a point of sale (PoS) terminal 103 and a database 105. A contactless smart device 102 or magnetic stripe card (not shown) may also be used with payment system 100.

In one embodiment, contactless device reader 101 may include any radio frequency (RF) proximity reader 110 that is capable of reading contactless smart devices (e.g., a contactless smart card) that are brought in close range to the reader. In one embodiment, RF proximity reader 110 may include a transceiver unit, such as a radio controller chip, that is capable of transmitting RF signals to (and receiving RF signals from) contactless smart device 102. RF proximity reader 110 may also include an antenna that transmits an electromagnetic field.

The antenna may use the electromagnetic field to establish a connection to a built-in antenna on contactless smart device 102. In order to communicate with contactless smart device 102, contactless device reader 101 (via transceiver unit) may utilize amplitude modulation (AM) to transmit signals via the electromagnetic field. By turning the electromagnetic field on and off very quickly (e.g., by quickly switching power on and off), contactless device reader 101 is able to communicate with contactless smart device 102. In a typical implementation, when contactless smart device 102 is brought in proximity of reader 101, contactless smart device 102 is powered through inductive coupling with reader 101 and transmits Track 1 and Track 2 data to reader 101. The Track 1 and Track 2 data includes the PAN number and other information, which enables the card issuer to validate a transaction.

Contactless device reader 101 may also include a display 107, a keypad 116, and a card swipe channel 106. Display 107 may include a liquid crystal display (LCD) or any other like display screen to provide information to a user. In one embodiment, display 107 may serve as a user interface by functioning as a touch screen. Keypad 116 may also provide a user interface along with display 107 and LED indicator lights (not shown). In one embodiment, card swipe channel 106 includes a magnetic stripe card reader (not shown) which may be used to read data such as an account number or identification number from magnetic stripe card (e.g., a credit card).

In one embodiment, contactless smart device 102 may include an embedded chip 104 (e.g., a secure microcontroller or like device), internal memory, and a small antenna. As used herein, the term "smart device" refers to any device with processing capabilities. A smart device may have on-board memory or other storage capacity (e.g., embedded chip 104), may be written to as well as read from, and may contain one or more applications that perform a particular function. Some smart devices may contain an operating system and/or user interface. In one embodiment, embedded chip 104 may be used to store a customer's usual order preference data. Notably, embedded chip 104 may contain a plurality of "usual orders", which may include purchase preference for a single vendor of a plurality of vendors.

As used herein, the term "contactless smart device" refers to a smart device that can communicate wirelessly via an electric and/or magnetic field between the device and some other entity, usually a wireless terminal or reader (e.g., contactless device reader 101). One type of wireless communications that can be used between contactless smart device 102 and contactless device reader 101 is near field communications (NFC). In one form of near field communications, contactless smart device 102 may communicate with contactless device reader 101 via inductive coupling of the contactless device reader antenna to the contactless smart device antenna. The two respective loop antennas effectively form a transformer that generates an electromagnetic field. As mentioned above, contactless device reader 101 uses amplitude modulation (AM) to manipulate the radio frequency (RF), or electromagnetic, field in order to send information to contactless smart device 102. Contactless smart device 102, in turn, communicates with the contactless device reader 101 by draining power from the field and modulating the loading on the device antenna, which consequently modulates the load on the device reader antenna. By communicating in this matter, contactless smart device 102 is able to receive data from (e.g., write usual order data) and send data to (e.g., stored usual data) contactless device reader 101.

Contactless smart device technology is available in a variety of forms, such as plastic cards, key fobs, wristbands, wristwatches, bracelets, jewelry, coffee cups, music players, hand-held game players, mobile phones, personal digital assistants (PDAs) provisioned with soft cards, and similar handheld devices. If contactless smart device 102 includes a user interface and display (e.g., a mobile phone or PDA), the user interface may be used by the consumer to accept, prioritize, sort, assign a name to, assign an icon to, and/or overwrite prior data related to the usual order preference data.

Payment system 100 may also include a point of sale (PoS) unit 103. In one embodiment, PoS unit 103 may include a cash register or similar device operated by a cashier that is communicatively connected to both database 105 and contactless device reader 101. In an alternate embodiment, PoS unit 103 may be incorporated with contactless device reader 101 and implemented in a stand alone "self service" kiosk to be used by a consumer.

Database 105 may include any software-based data structure that is configured to store data in memory. In one embodiment, database 105 may be contained in a backend storage server that is communicatively coupled to both PoS unit 103 and contactless device reader 101. Database 105 may be configured to store entries of customer account numbers and/or identifier numbers with corresponding "usual order" preference data.

As mentioned above, payment system 100 may utilize other types of readers instead of contactless device reader 101. In one embodiment, the reader may utilize other types of NFC, such as using an NFC-enabled handset embodied in a cellular phone to interact with a smart poster. For example, a smart poster may utilize a passive (i.e., unpowered) NFC tag from which a user can extract data by interfacing the tag with an NFC-enabled handset. The obtained data may be a uniform resource locator (URL) associated with a website that is capable of identifying the NFC-enable handset and storing the user's usual order. Similarly, an infrared reader may be used to interface with other identification articles, such as a bar code or fingerprint. In embodiments where the identification article cannot store the usual order data within itself, a database or other storage device may be used.

In one embodiment, the aforementioned payment system 100 may be configured to utilize a contactless smart device or magnetic stripe card to implement a method of recurrent ordering of "usual" purchases. More specifically, system 100 may be adapted so that usual orders or purchases that are made by a consumer on a regular basis can be processed with greater efficiency (so that time and expenses are saved by all parties involved in the purchase transaction).

For instance, consider the scenario where a consumer approaches a cashier operating PoS terminal (e.g., PoS unit 103) and orders a good (or service), such as a certain type of hamburger (e.g., a hamburger with cheese and pickles). The cashier records the order normally so that the hamburger can be prepared and then asks the customer if the recent order should be registered as a "usual order." If the consumer agrees, then the cashier may press one or more buttons (e.g., a "Make Usual Order" button) on PoS unit 103 to designate the transaction as the "usual order." The consumer may then be prompted to interface (e.g., "tap") contactless smart device 102 to contactless device reader 101 in order to store the usual order information (that registered on PoS unit 103) on embedded chip 104. In one embodiment, the usual order information is transferred using NFC. Once a consumer has the usual order data programmed on contactless smart device 102, contactless smart device 102 may be subsequently interfaced with contactless device reader 101 to complete a payment transaction. Furthermore, the consumer is able to use contactless smart device 102 in the same manner (without re-registering) in order to place a usual order and automatic payment on a subsequent visit.

In an alternate embodiment, the registering of usual order data and the recurrent ordering may be conducted at a "self service" unmanned kiosk (i.e., without the involvement of a cashier) without deviating from the scope of the present subject matter. A self service kiosk may include any station or terminal in which a customer may purchase a good or service without the assistance of a cashier. Typically, a customer may initially select an item (e.g., make a selection via a user interface or scan the item's UPC tag) and subsequently use a contactless smart device or credit card to purchase the selected item via an automated device or card reader. The kiosk may be positioned in a remote location (e.g., a stand alone station in a mall) or may be located in the store itself (e.g., thereby providing customers an alternative "check out" option or to avoid longer lines handled by a cashier). Alternatively, a simple smart poster may be used to place an order. For example, a smart poster may include a passive NFC tag that contains a URL of a website that contains the customer's previously designated usual order.

Upon returning to the vender or store on a subsequent visit, the customer may desire to order his "usual order." To do this, the customer simply has to interface an identification article with a reader device (or smart poster). The usual order is then obtained from the storage device (e.g., a contactless smart device, a database, a website, etc.) via communications with a PoS terminal. Once obtained by (or provided to) the PoS terminal, a computer or cashier may finalize the purchase transaction.

Figure 2:
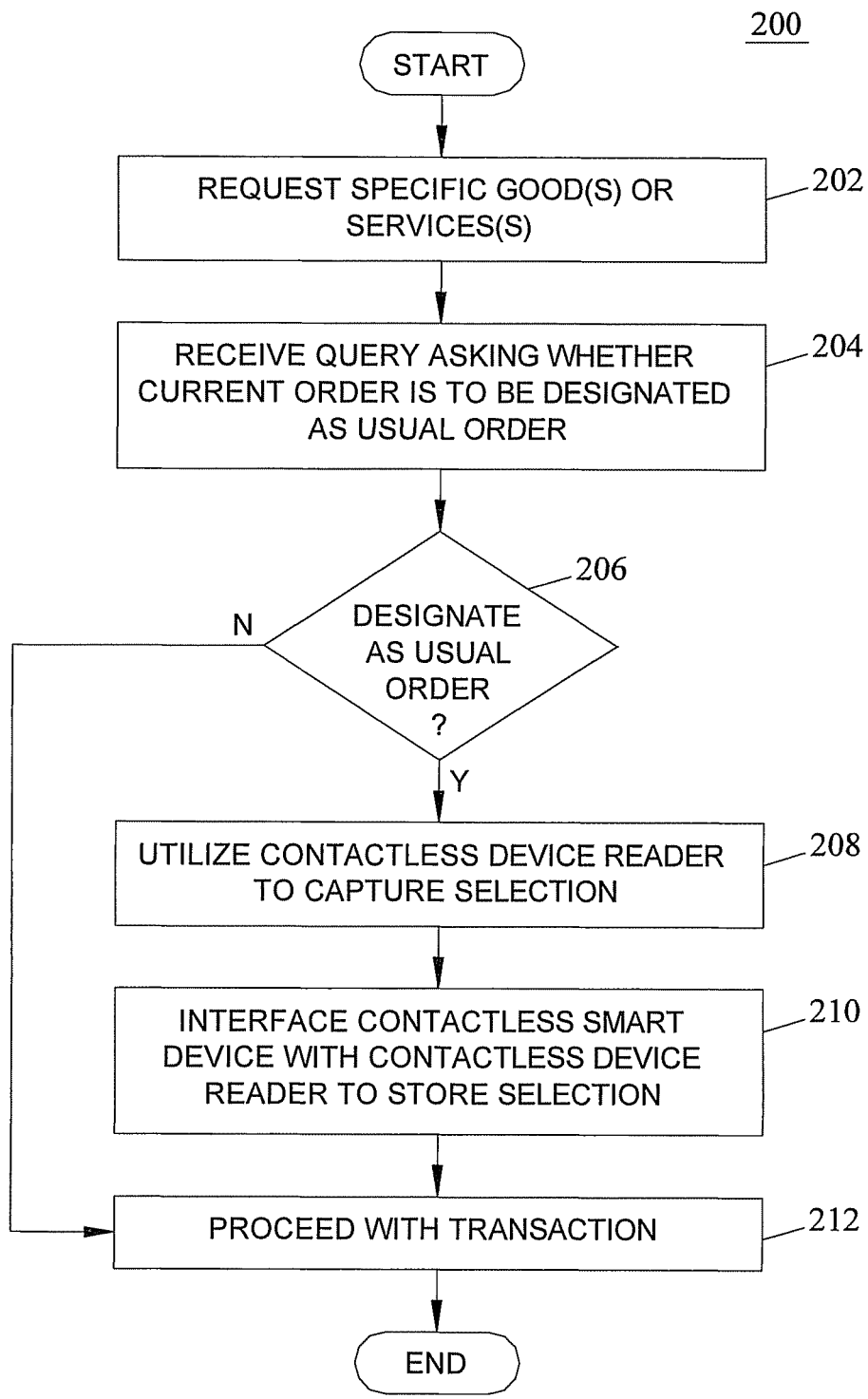
FIG. 2 is a flow chart illustrating exemplary steps for registering usual order preference data utilizing an identification article according to an embodiment of the subject matter described herein.
Figure 3:
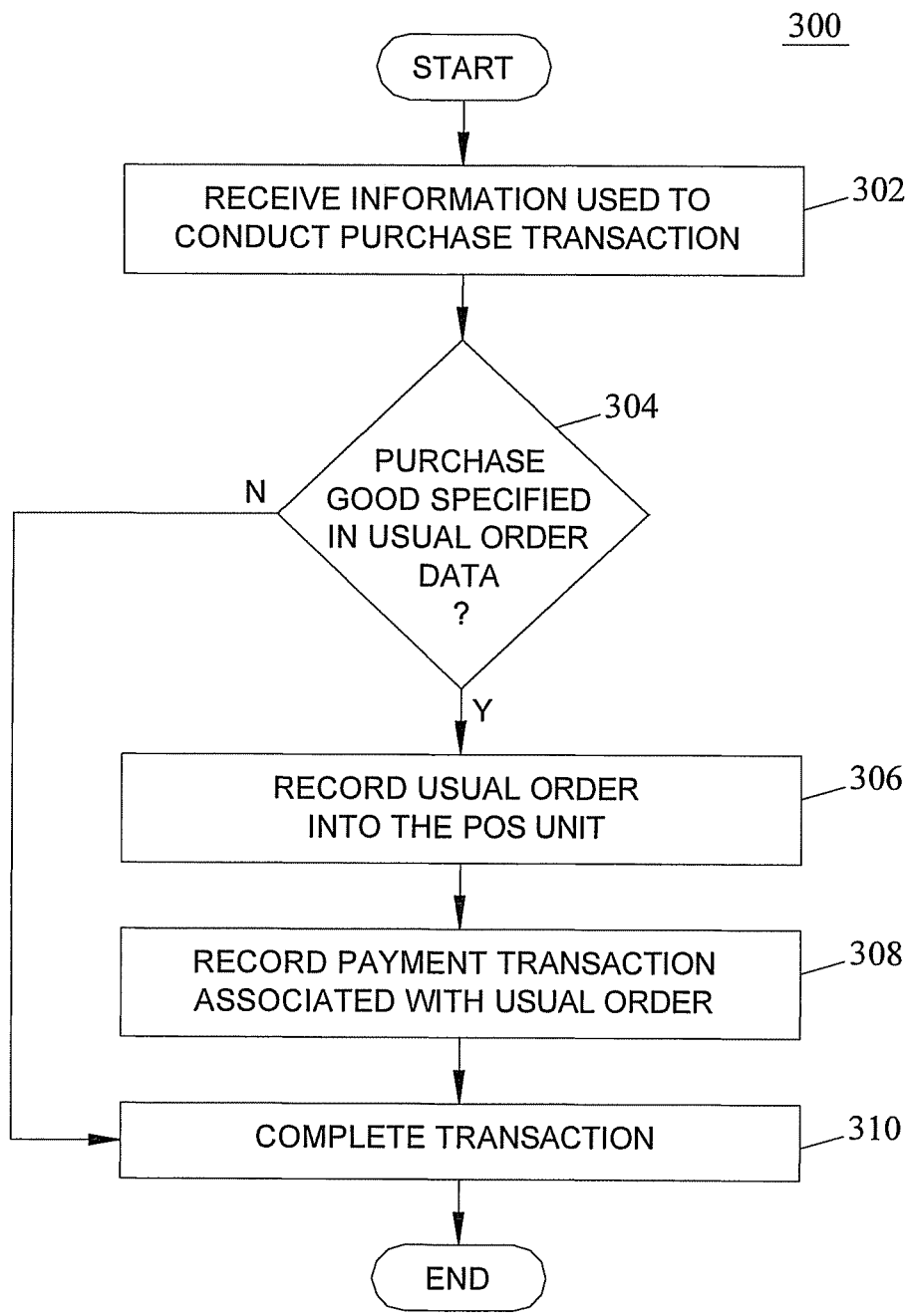
FIG. 3 is a flow chart illustrating exemplary steps for ordering a good or service utilizing stored usual order preference data according to an embodiment of the subject matter described herein.

FIG. 2 and FIG. 3 are respectively presented below in order to better illustrate the described registration and recurrent ordering aspects of the present subject matter. Specifically, FIG. 2 is a flow chart depicting a method 200 including exemplary steps for registering usual order preference data utilizing a contactless smart device or magnetic stripe card.

In block 202, a request for a specific good or service is made. In one embodiment, a customer places an order for a good, such as a hamburger, from a vendor or cashier at point of sale (PoS) unit 103. In an alternate embodiment, a customer may place an order for a good (or service) using a "self-serve" PoS terminal (i.e., without a cashier ringing the order up). In this scenario, contactless device reader 101 may also function as the self-serve PoS unit.

In block 204, a query as to whether the recently placed order is to be designated as a "usual order" is received. In one embodiment, the cashier asks the customer if the recent order (placed in block 202) should be designated as the customer's usual order. In an alternate embodiment, a customer may receive the query from a contactless device reader's display screen 107 at a self-serve kiosk. In one embodiment, the issuing of the query asking if the initial order is to be designated as a usual order is conducted as part of receiving the initial order. For example, both the issuing of the query and the receiving of the initial order may be performed contemporaneously, simultaneously, or the like.

In block 206, a determination is made as to whether the current order is designated as the usual order. If the current order is designated as the usual order, then method 200 proceeds to block 208, otherwise method 200 continues to block 212. In one embodiment, the customer may communicate to the cashier or via a user interface at a self serve kiosk that the current order is (or is not) to be designated as the usual order. In an alternate embodiment, a customer may designate a usual order on a website that is associated with one or more smart posters. The usual order may be registered with the website at the time and place of purchase, or alternatively, separate from the time of purchase (e.g., at home via the Internet). However, it is important to note that the scope of the present subject matter does not require, in any form or fashion, a prior web-based registration.

In block 208, a point of sale terminal is utilized to capture the selection. In one embodiment, a cashier may press a single button (or some other similar mechanism) at PoS unit 103 in order to electronically indicate that the most recent order (taken in block 202) is to be registered as the customer's usual order. In an alternate embodiment, the customer may press a similar button or touch screen of contactless device reader 101 at a self-serve kiosk to capture the usual order designation.

In block 210, a contactless smart device is interfaced with the wireless device reader to store the usual selection (i.e., usual order). In one embodiment, the customer may "tap" contactless smart device 102 on contactless device reader 101. Once contactless smart device 102 comes in close proximity (e.g., within RF range) with contactless device reader 101, smart device 102 receives a signal (e.g., via NFC) that contains the usual order data from PoS unit 103 via contactless device reader 101. The usual order data is then stored locally on embedded chip 104.

In an alternate embodiment, the usual order information is stored on database 105 instead of embedded chip 104. More specifically, when contactless smart device 102 comes in proximity with contactless device reader 101, card reader 101 obtains account data and/or identification number data from embedded chip 104 and stores the data with the designated usual order information (obtained in block 208) in database 105. In this embodiment, a magnetic stripe card may be used in lieu of contactless smart device 102 since the magnetic stripe card is capable of storing and providing account information to contactless device reader 101 via card swipe channel 106. In one embodiment, a plurality of "usual orders" associated with a single customer may be stored on contactless smart device 204 or database 105. Notably, the plurality of usual orders may include usual order preferences for a single vendor or multiple (i.e., different) vendors.

In block 212, the transaction proceeds as normal. In one embodiment, the cashier continues processing the purchase transaction. Method 200 then ends.

FIG. 3 is a flow chart depicting a method 300 including exemplary steps for ordering a good utilizing stored usual order preference data. In block 302, information associated with an identification article used to purchase a good or service is received. In one embodiment, this may involve the initiation of a transaction to purchase a good or a service using one of a contactless smart device or a magnetic stripe card is detected. For example, contactless smart device 102 may be interfaced with contactless device reader 101 that detects its presence. For instance, a customer desiring to place a usual order "taps" contactless smart device 102 on contactless device reader 101 instead of ordering the good (or service) in the conventional manner. In one embodiment, contactless device reader 101 receives a signal from contactless smart device 102 and determines whether usual order preference information is stored in (or for) the contactless smart device. Specifically, the signal may contain a customer identification (or account) number and/or data including a customer's usual order. Both forms of data may be stored in embedded chip 104. If an identification number is provided, then database 105 may be subsequently accessed to determine if usual order preference information is stored. In an alternate embodiment, a magnetic card may be swiped in channel 106 to provide an identification or account number to contactless device reader 101. In this embodiment, a customer's account or identification number may be used to access database 105 to determine if usual order preference information is stored. In an alternate embodiment, an NFC-enabled device (e.g., a cellular phone) may be used to interface with a smart poster. Contactless device reader 101 may be located at a point of sale with a cashier, may be integrated with PoS unit 103 at a standalone kiosk, or may be completely standalone using electronic means to communicate remotely with a restaurant ordering system based on the initiation of the transaction with the identification article. In another embodiment, the receiving of information may be performed by a cashier that manually enters the information (e.g., an alphanumeric code) into a register computer.

In block 304, an option to purchase the good or the service specified by the usual order preference information is presented. In one embodiment, the cashier may ask the customer if he would like to purchase his usual order. In an alternate embodiment, a customer may be asked the same query via display screen 107 at a contactless device reader incorporated into a self-service kiosk. If the customer wishes to purchase his usual order, method 300 continues to block 306. Otherwise, method 300 continues to block 310. In an alternate embodiment, an NFC-enabled device obtains a URL from the smart poster. The NFC device then sends a signal to the website associated with the URL which contains the customer's usual order. The website may then ask the customer (via the cellular phone's display screen) if he wishes to request and/or purchase the usual order. In an alternate embodiment, an option to purchase the good or the service specified by the usual order preference information is not presented. Rather, contactless device reader 101 may be configured to automatically receive and apply the usual order to the purchase transaction (as explained below in block 306).

In block 306, the usual order is recorded at the point of sale terminal. In one embodiment, contactless device reader 101 forwards the usual order data it received from contactless smart device 102 in block 304 to PoS unit 103. In an alternate embodiment, contactless device reader 101 forwards the customer identification number (or account number) received in block 304 (either from a contactless smart device or magnetic stripe card) to PoS unit 103. PoS unit 103 subsequently accesses database 105 using the received identification number to obtain the associated stored usual order data. In an alternate embodiment, a website associated with a smart poster may send the usual order data to PoS unit 103 for a purchase transaction.

In block 308, a payment transaction corresponding with the usual order is effected. In one embodiment, PoS unit 103 automatically processes (i.e., "rings up") the usual order at a predefined price. For example, after receiving the usual order data from contactless device reader 101 (or database 105), PoS unit 103 deducts the price associated with the usual order from an account (e.g., debit card account, credit card account, etc.) corresponding with contactless smart device 102, or a magnetic stripe card.

In block 310, the sales transaction continues until completion. Method 300 then ends.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for storing usual order preferences associated with a point of sale transaction involving an identification article, the method comprising:
   receiving, at a point of sale during a first transaction, an initial order involving the use of an identification article for purchasing at least one good or service, wherein the point of sale includes a point of sale unit that comprises at least one of a cash register or a contactless card reader, and wherein the identification article includes at least one of: a contactless smart device, a magnetic stripe card, and a near field communications (NFC) enabled device;
   as part of receiving the initial order, issuing a query asking if the initial order is to be designated as a usual order at the point of sale, wherein issuing the query is performed contemporaneously with receiving the initial order, wherein the usual order designation does not include a prior web-based registration;
   registering, at the point of sale, the initial order as the usual order if a received response to the query indicates a usual order designation;
   storing an indication of the usual order of the at least one good or service in a storage device disposed within the identification article; and
   using a smart poster or reader device, interfacing with the identification article, obtaining the stored indication of the usual order, and communicating the stored indication of the usual order to the point of sale unit to initiate a second transaction for purchasing the at least one good or service corresponding to the usual order.

2. The method of claim 1 wherein receiving an initial order includes receiving the initial order from an electronic signal at a point of sale terminal.

3. The method of claim 1 wherein receiving an initial order includes a cashier receiving the initial order from a customer.

4. The method of claim 1 wherein issuing a query includes issuing a query message that is displayed on at least one of a card reader and a point of sale terminal.

5. The method of claim 1 wherein registering the initial order as the usual order includes activating one of a point of sale terminal and a card reader to register the initial order as the usual order.

6. The method of claim 1 wherein storing the usual order includes electronically recording the usual order by interfacing the contactless smart device with a card reader.

7. The method of claim 1 wherein issuing a query is performed by a cashier.

8. The method of claim 6 wherein interfacing the contactless smart device with a card reader includes bringing the contactless smart device in proximity to the card reader.

9. The method of claim 1 wherein the contactless smart device includes at least one of a plastic card, a key fob, a wristband, a wristwatch, a bracelet, a piece of jewelry, a coffee cup, a music player, a hand-held game player, a mobile phone, and a personal digital assistant (PDA).

10. A system for utilizing stored customer preferences for recurrent ordering, the system comprising:

a device reader at a point of sale for receiving, during a first transaction, an initial order involving the use of a contactless identification article for purchasing at least one good or service, issuing, contemporaneously with receiving the initial order, a query asking if the initial order is to be designated as a usual order as part of receiving the initial order, wherein the usual order designation does not include a prior web-based registration, registering the initial order as the usual order if a received response to the query indicates a usual order designation, storing an indication of the usual order of the at least one good or service in a storage device disposed within the identification article, and using a smart poster or reader device, interfacing with the identification article, obtaining the stored indication of the usual order, and communicating the stored indication of the usual order to a point of sale terminal to initiate a second transaction for purchasing the at least one good or service corresponding to the usual order.

11. The system of claim 10 wherein the device reader is further adapted to receive information associated with the identification article used to purchase the at least one good or service, and in response to receiving the information, determine whether usual order preference information is stored for the identification article.

* * * * *